United States Patent
Sawant (10) Patent No.: US 12,090,923 B1
(45) Date of Patent: Sep. 17, 2024

(54) METHODS AND SYSTEMS FOR PROVIDING VISUAL AND AUDIO GUIDANCE TO A VEHICLE USER

(71) Applicant: Zoox, Inc., Foster City, CA (US)

(72) Inventor: Rahul Dhananjay Sawant, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/322,433

(22) Filed: May 17, 2021

(51) Int. Cl.
| | |
|---|---|
| *B60N 2/02* | (2006.01) |
| *B60Q 3/233* | (2017.01) |
| *B60Q 3/54* | (2017.01) |
| *B60W 60/00* | (2020.01) |
| *G06Q 10/02* | (2012.01) |
| *G08B 5/22* | (2006.01) |
| *G08B 5/36* | (2006.01) |
| *B60H 1/00* | (2006.01) |

(52) U.S. Cl.
CPC .............. *B60Q 3/233* (2017.02); *B60Q 3/54* (2017.02); *B60W 60/0013* (2020.02); *G06Q 10/02* (2013.01); *G08B 5/223* (2013.01); *G08B 5/36* (2013.01); *B60H 1/00735* (2013.01)

(58) Field of Classification Search
CPC ..... B60Q 3/233; B60Q 3/54; B60W 60/0013; G06Q 10/02; G08B 5/223; G08B 5/36; B60H 1/00735
See application file for complete search history.

(56) References Cited

U.S. PATENT DOCUMENTS

| | | | | |
|---|---|---|---|---|
| 2018/0181359 | A1* | 6/2018 | Monroe | B60Q 3/10 |
| 2021/0178936 | A1* | 6/2021 | Yetukuri | G01C 21/3605 |
| 2021/0276459 | A1* | 9/2021 | Yetukuri | B60N 2/976 |
| 2021/0380022 | A1* | 12/2021 | Kanitz | G06N 5/04 |
| 2021/0398027 | A1* | 12/2021 | Veluppillai | G06Q 10/06315 |
| 2022/0108228 | A1* | 4/2022 | Salter | H04W 4/023 |

FOREIGN PATENT DOCUMENTS

| | | | | |
|---|---|---|---|---|
| DE | 102021125735 A1 | * | 4/2022 | B60N 2/002 |
| WO | WO-2020179782 A1 | * | 9/2020 | |

* cited by examiner

*Primary Examiner* — An T Nguyen
(74) *Attorney, Agent, or Firm* — Lee & Hayes, P.C.

(57) ABSTRACT

Techniques for configuring a vehicle based on user data. A vehicle can receive user data indicative of an environment setting associated with the vehicle, such as a temperature setting, an active safety setting, a suspension setting, etc. The vehicle can use the user data to determine a seat for a user associated with the user data. The user data can include request data and seat preference data. The vehicle can generate and send a seat assignment message to a device associated with the user data. The vehicle system can be configured based on the environment setting associated with the vehicle. The vehicle system can further output an indication for guiding the user to the vehicle seat. In some examples, the indication can be emitted via lights embedded in a headliner of the vehicle.

21 Claims, 6 Drawing Sheets

METHODS AND SYSTEMS FOR PROVIDING VISUAL AND AUDIO GUIDANCE TO A VEHICLE USER

BACKGROUND

Conventional vehicles may include heating, ventilation, and air conditioning (HVAC) systems that are used to control the temperature and/or humidity of a given area of the vehicle. However, the vehicle typically defaults to the last temperature and/or humidity settings that were active when the vehicle was turned off or otherwise may not be customized for a specific user at a specific location in the vehicle. Similarly, entertainment systems may exist in vehicles but may not be properly configured for a specific user at a specific location.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques for configuring a vehicle based on user data and guiding a user to a specific location within the vehicle configured according to the profile data are discussed herein. For example, techniques can include determining a vehicle seat based on user data of a user, configuring an HVAC system for the vehicle seat, and/or outputting an indication that provides instruction for guiding the user to the vehicle seat are discussed herein. In some examples, a vehicle system may receive a signal containing user data from a device associated with the user data. The vehicle system may determine a vehicle seat based on the user data and configure a component of an HVAC system for the vehicle seat determined based on the user data to achieve a comfortable temperature and/or humidity desired by the user. The vehicle system may further configure an active safety system, vehicle seat system, vehicle suspension system, and/or other systems based on the user data. In some examples, the vehicle system may output a visual indication via one or more light emitters embedded in the interior and/or the exterior of the vehicle to guide the user to the vehicle seat. In some examples, the vehicle system may output an audio indication via one or more audio emitters embedded in the interior and/or the exterior of the vehicle to guide the user to the vehicle seat. Furthermore, in some examples, a seat may be selected for a specific user based on a similarity between existing or prior conditions and the conditions determined based on the user data which may lead to energy savings.

In some examples, the user data may include one or more environment settings associated with the vehicle, such as, for example, a temperature setting, an active safety setting, and/or a suspension setting. In some examples, the user data may include request data and the vehicle system may determine a preferred setting associated with the vehicle based on the request data. In some examples, the user data may include seat preference data indicating a preferred seat direction and the vehicle system may determine a preferred setting associated with the vehicle based on the seat preference data. Accordingly, the vehicle system may assign a vehicle seat for the user and configure a component of an HVAC system for the assigned vehicle seat based on the user data. In some examples, entertainment (e.g., ambient music, genres of music, playlists, television media) may be provided in the vicinity of the seat that the user is guided to. Ambient lighting conditions may also be arranged and/or seat setting(s) may be based on user preferences.

In some examples, the vehicle system may generate a seat assignment message indicative of the visual and/or audio indication and the assigned vehicle seat for the user. The vehicle system may further send the seat assignment message to the device associated with the user data.

In some examples, the visual indication may be outputted via one or more light emitters embedded in the interior and/or the exterior of the vehicle. In some examples, the one or more light emitters may be embedded in a headliner of the vehicle. In some examples, the one or more light emitters may be embedded in a floor or respective sides of the vehicle. The one or more light emitters may be associated with a particular vehicle seat. For example, one or more light emitters associated with the assigned vehicle seat may be turned on and one or more light emitters that are not associated with the assigned vehicle seat may be turned off when the vehicle arrives at a pickup location of the user. Additionally, in some examples, the visual indication may be outputted via one or more task lights, displays, and/or passive seat identifiers (e.g., seat number, seat color, etc.).

In some examples, the vehicle system may further output an audio indication via one or more audio emitters (e.g., speakers, speaker arrays, etc.) in the interior and/or the exterior of the vehicle. In some examples, the one or more audio emitters can be embedded in the headliner of the vehicle.

In some examples, the vehicle system can receive sensor data from one or more sensors and determine that the user associated with the user data is in the vehicle and not seated on the vehicle seat for the user associated with the user data based on the sensor data. For example, an approximate location of the user can be determined based on GPS data of the device associated with the user data. Based on the approximate location of the user, the vehicle system can determine whether the user associated with the user data is in the vehicle. Alternatively or additionally, sensors of the vehicle can be used to determine a location of the user or a mobile device associated with the user. For example, a vehicle sensor (e.g., an imaging sensor either external or internal to the vehicle) may identify the user's location by identifying the user or an emitter of a mobile device. The vehicle system can further determine whether the user is seated on the vehicle seat based on sensors associated with the vehicle. For example, the vehicle seat can be coupled with one or more occupancy sensors (e.g., pressure sensor(s), infrared (IR) sensor(s), RGB sensor(s), image sensor(s), ride height sensor(s), Near Field Communication (NFC) sensor(s) and the like), and accordingly, the vehicle system can determine the user associated with the user data is in the vehicle and not seated on the vehicle seat based on the GPS data and the sensor data captured by the occupancy sensor associated with the vehicle seat. The vehicle system can further output a second visual indication within the interior of the vehicle to provide a second instruction for guiding the user to the vehicle seat.

An image sensor may be located in the cabin and associated with several seats. Visual analytics or machine learning may be used to determine a location of a user within a cabin by identifying a specific user or a user's mobile device as disclosed herein. In some examples, a user's location or proximity can be determined based on one or more electromagnetic emitters (e.g., Wi-Fi, NFC, millimeter wave) using trilateration, for example. Conventional vehicles may include HVAC systems that are used to control the temperature and/or humidity of a given area of the vehicle. A vehicle can default to the last temperature and/or humidity settings that were active when the vehicle or system was deactivated or otherwise may not be set up to a specific user's preferences. (e.g., may be set to a different user's preferences or a default state.) This may result in possible drawbacks. For example, people may feel comfortable at different temperatures, blower locations, and/or humidity levels, and an HVAC having different settings for the user may result in discomfort and a dissatisfied ride experience.

The techniques discussed herein can improve the effectiveness of configuring a vehicle by automatically configuring an HVAC system for a seating location (e.g., a vehicle seat) based on user data and directing a user to the seating location. The use of user data to determine the seat and/or configure the HVAC system for the seat can provide an improved environment tailored to the user's preferences. Furthermore, the techniques discussed herein can improve user experiences by outputting a visual or other indication to guide the user to the vehicle seat. These and other improvements to the functioning of the computer are discussed herein.

The techniques described herein can be implemented in a number of ways. Example implementations are provided below with reference to the following figures.

Figure 1:
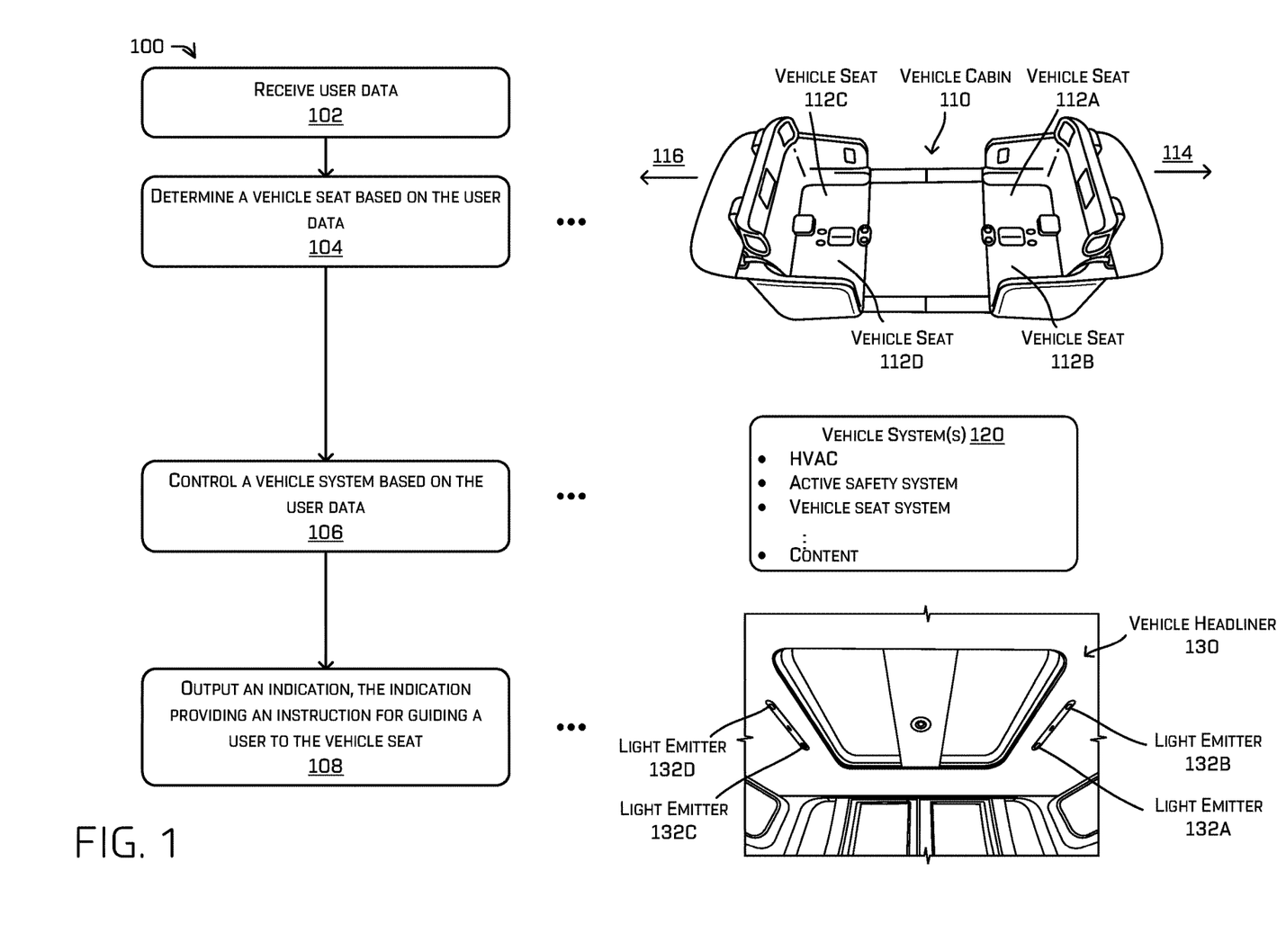
FIG. 1 is a pictorial flow diagram of an example process for guiding a user to a vehicle seat.

FIG. 1 is a pictorial flow diagram of an example process 100 of receiving user data, determining a vehicle seat based on the user data, controlling a vehicle system based on the user data, and outputting an indication that provides instruction for guiding a user to the vehicle seat.

An operation 102 can include receiving user data from a device associated with a user data. In some examples, the user data can include one or more environment settings associated with the vehicle, such as, for example, the temperature, humidity, air flow rate, air flow mode (e.g., bilevel mode, feet mode, head mode), oscillating pattern, and/or fan speed. In some examples, the user data can further include one or more of an active safety setting, a suspension setting, a seat setting, and/or an entertainment setting. In some examples, a server device may store the user data and update one or more settings in the user data based on heuristics of the user's previous settings, set directly by the user, user's age, and/or environmental conditions.

In some examples, the one or more of these environment settings associated with the vehicle may be determined based on a signal received from the device associated with the user data. For example, the device associated with the user data may be any device capable of communicating a signal to the vehicle system of the vehicle, such as, for example, a smartphone, a tablet, a computer, and/or a wearable communication device, such as, for example, glasses, a watch, a bracelet, a necklace, an anklet, a pin/brooch, cufflinks, earrings, or rings, etc., which, in some examples, may include an application configured to facilitate selection of preferences by the user. In some examples, a user may sign into the vehicle using biometrics or a passcode. For example, a user may use a thumbprint to enter a vehicle at a stop and select a destination.

In some examples, the one or more of these environment settings associated with the vehicle may be determined based on request data. In some examples, the user data can include request data and the vehicle system can determine a preferred setting associated with the vehicle based on the request data. For example, the request data may include information about previous rides, such as temperatures (e.g., vehicle temperature and/or ambient temperature (or ambient weather)), humidifies, and air flow rates of the previous rides. The vehicle system may then determine a preferred temperature, humidity, and air flow rate based on the request data. For example, the vehicle system may determine an average requested temperature, an average requested humidity, and an average requested air flow rate based on the request data.

In some examples, the one or more of these environment settings associated with the vehicle may be determined based on seat preference data. For example, the user data can include seat preference data indicating seat preferences, such as preferred seat height, seat angle, seat stiffness, seat lumbar support, seat headrest, legroom distance, seat heating level, the direction of travel, seat lighting color, and/or content to be displayed on a video screen associated with a seat. In some examples, the vehicle system may receive the seat preference data from the device associated with user data and determine the one or more of these environment settings associated with the vehicle based on the seat preference data.

An operation 104 can include determining a vehicle seat of the vehicle based on the user data. An example of a vehicle cabin is illustrated as vehicle cabin 110. The vehicle cabin 110 may include a plurality of vehicle seats 112, which may be provided in any relative arrangement. The example vehicle cabin 110 includes an example carriage-style seating arrangement with four vehicle seats 112A-112D. However, it is contemplated that each end of the vehicle cabin 110 may include one, three, five, or more seats 112 adjacent to one another, and thus, the vehicle cabin 110 may be configured to provide seating for two, six, ten, or more occupants. The example vehicle may have four-wheel steering and may operate generally with equal performance characteristics in all directions, for example, such that the vehicle seats 112C and 112D of the vehicle are the front-facing seats when traveling in a first direction 114, and such that the vehicle seats 112A and 112B becomes the front-facing seats when traveling in the opposite, second direction 116, as shown in FIG. 1. Based on the user data, the vehicle system can determine a vehicle seat for the user. For example, the user data may include seat preference data indicating that the user prefers a forward-facing seat, and the vehicle system may assign vehicle seat 112C or 112D to the user when traveling in the first direction 114. Additionally, the vehicle system may configure a route to ensure directionality of the vehicle based on the assigned vehicle seat.

In some examples, the user data may include booking class data, and the vehicle system may assign a vehicle seat based on the booking class data. In some examples, the user data may further include data indicating the amount of luggage carried by the user, one or more conditions of the user (e.g., physical condition, age, etc.), and the vehicle system may determine the vehicle seat based on the user data.

In some examples, the vehicle seat may be determined based on the user data and seating parameters, such as a current condition of an adjacent seat or a previous condition of the vehicle seat. For example, vehicle seats 112A and 112D may be occupied and preconditioned to reach ambient temperatures of 68 degrees Fahrenheit (° F.) and 78° F., respectively. The user data may include seat preference data indicating that the user prefers an ambient temperature around 70° F. Based on determining the ambient temperature of seat 112A (e.g., 68° F.) is closer to the user preferred ambient temperature (° F.) than the ambient temperature of seat 112D, the vehicle system may assign vehicle seat 112B (adjust to seat 112A) to the user. By selecting a vehicle seat based on a similarity between existing or prior conditions and the conditions determined based on the user data, the vehicle system may improve energy efficiency and reduce HVAC system fuel consumption.

In some examples, the vehicle system may generate a seat assignment message indicative of the vehicle seat for the user and send the seat assignment message to a user device associated with the user data. For example, the vehicle system may generate a message indicating a seat number and transmit the message to the user device for the user to confirm the seat assignment.

An operation 106 can include controlling a vehicle system based on the user data to adjust the environment settings according to the preferences of the user. An example of a vehicle system is illustrated as a vehicle system 120. The vehicle system 120 can include various systems, such as an HVAC system, active safety system, vehicle seat system, vehicle suspension system, entertainment system, and/or other systems. The HVAC system may be configured to provide an ability for the user to adjust the temperature, humidity, air flow mode (e.g., bilevel mode, feet mode, head mode), oscillating pattern, fan speed, and/or air flow rate according to his or her preferences. For example, the HVAC system may include one or more HVAC units, and each HVAC unit may be configured to provide the ability for the user to adjust the temperature, humidity, and/or air flow rate in a particular seat location. The HVAC units may include any known systems and/or devices configured to cool air, heat air, dehumidify air, humidify air, freshen air, and/or add fragrance, such as, for example, compressors, heat pumps, condensing coils, evaporating coils, blowers, filters, etc. An example of an HVAC unit to be implemented in a vehicle is described in U.S. patent application Ser. No. 16/017,424 titled "Heating Ventilation And Air Conditioning (HVAC) System With Zonal Control" and filed Jun. 25, 2018, the entirety of which is herein incorporated by reference in its entirety for all purposes.

In some examples, the vehicle system 120 can include an active safety system. The active safety system may be configured to provide an ability for the user to adjust one or more active safety features to improve the safety of the user in case of a collision, such as adjusting seat height, belt tension, and/or airbag pressure. In some examples, the vehicle system 120 can include a vehicle seat system. The vehicle seat system may be configured to provide an ability for the user to adjust seat height, seat angle, seat stiffness, seat lumbar support, seat headrest, legroom distance, seat lighting color, and/or content to be displayed on a video screen associated with seat 112. In some examples, the vehicle system 120 can include a suspension system. The suspension system may be configured to provide an ability for the user to adjust the suspension stiffness setting of the vehicle.

Upon determining one or more environment settings based on the user data, the vehicle system 120 may generate a seat configuration message indicative of the one or more environment settings and send the seat configuration message to a user device associated with the user data. For example, the vehicle system 120 may generate a message indicating a preferred temperature setting determined based on the user data and send the message to the user device for user confirmation. A user may provide feedback for confirming or updating the preferred temperature to the vehicle system 120 by sending a feedback message.

An operation 108 can include outputting an indication that provides instruction for guiding a user to the vehicle seat. In some examples, the indication may be outputted via one or more light emitters 132 embedded in the interior of the vehicle to guide the user to the vehicle seat. For example, a vehicle headliner 130 may include a plurality of light emitters 132, which may be provided in any relative arrangement. The example vehicle headliner 130 includes four light emitters 132A-132D. However, it is contemplated that vehicle headliner 130 may include eight, twelve, sixteen, or more light emitters 132, and thus, the one or more light emitters may be configured to provide the instruction for guiding the user to the vehicle seat. In some examples, each of light emitters 132 may be associated with a particular vehicle seat. For example, light emitter 132A may be associated with an assigned vehicle seat (e.g., vehicle seat 112A). Light emitter 132A may be turned on and light emitters 132B, 132C, and 132D that are not associated with the assigned vehicle seat may be turned off when the vehicle arrived at a pickup location of the user.

In some examples, the indication may be outputted via one or more light emitters embedded in a floor or respective sides of the vehicle. In some examples, the indication may be outputted via one or more directional lights, task lights, displays, and/or passive seat identifiers (e.g., seat number, seat color, etc.). For example, a vehicle may output the indication (e.g., a particular color, a graphic icon, or an animation, etc.) via an external screen to guide the user to the vehicle and output the indication via an internal display to guide the user to the assigned vehicle seat.

In some examples, the vehicle system 120 may generate a seat assignment message indicative of the indication and send the seat assignment message to a user device associated with the user data. For example, the vehicle system 120 may generate a message comprising a color, a symbol, or an animation that matches the indication within the interior of the autonomous vehicle and transmit the message to the user device for guiding the user to the assigned vehicle seat.

In some examples, the operation 108 further includes outputting an audio indication that provides instruction for guiding a user to the vehicle seat. Additional details of outputting the visual indication and/or audio indication that provides instruction for guiding the user to the vehicle seat are provided in connection with FIGS. 2A and 2B, as well as throughout this disclosure.

Figure 2A:
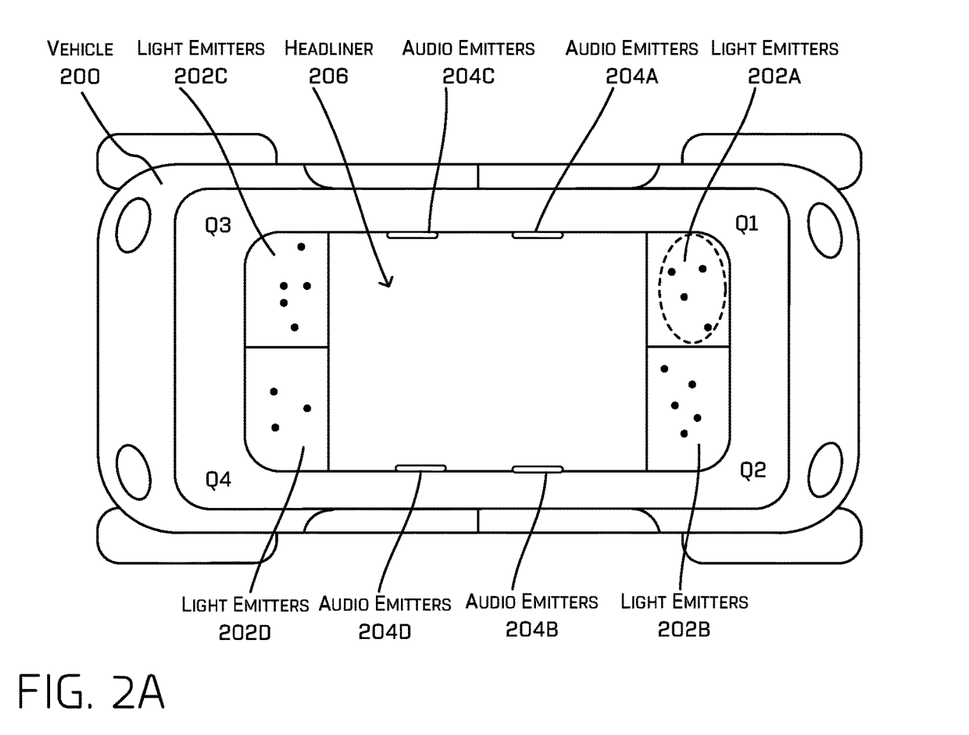
FIG. 2A is a top-down view of an example vehicle with cutaways to illustrate various light emitters and audio emitters embedded in a vehicle headliner of the vehicle.

FIG. 2A is a top-down view of an example vehicle 200 with cutaways to illustrate various light emitters 202A-202D and audio emitters 204A-204D embedded in a vehicle headliner 206 of the vehicle. In other examples, the light emitters 202 may be located at locations of the vehicle headliner 206 other than what is indicated in FIG. 2A.

Portions of the vehicle 200 may be identified as quadrant portions Q1, Q2, Q3, and Q4, as illustrated in FIG. 2A. Thus, each of the vehicle seats 240A and 240B may be illuminated by respective light emitters 202A and 202B located in quadrant portions Q1 and Q2, and each of the vehicle seats 240C and 240D may be illuminated by respective light emitters 202C and 202D located in quadrant portions Q3 and Q4. The light emitters 202 may be configured to output a visual indication that provides instruction for guiding a user to a vehicle seat. In some examples, each quadrant portion may be associated with a respective color. For example, the vehicle seat 240A and the light emitters 202A located in quadrant portions Q1 may be associated with light yellow color and the vehicle seat 240B and the light emitters 202B located in quadrant portions Q2 may be associated with light green color.

The light emitters 202 need not be a semiconductor (e.g., Light Emitting Diode (LED)) source, and instead may be an arc-type lamp, a halogen-type lamp, a laser beam, and so on. In some examples, the light emitters 202 may include fiber optic cable. While light emitters are illustrated in FIG. 2A to have a particular shape, in other examples the light emitters 202 may have other shapes. For example, the light emitters 202 may be circular, square, symmetrical, a point source, an extended source, and so on. Moreover, the light emitters 202 need not actually produce a particular broad-spectrum light and instead may produce a light spectrum comprising one or more visible light bands having a resulting emitted light equivalent to any color temperature (e.g., including a relatively high amount of "yellow" light or "blue" light). As mentioned above, the light emitters 202 may be configured to have particular optical characteristics, such as brightness and angular distribution of brightness, which may be designed or determined based, at least in part, on one or more various standards or regulations.

In some examples, the light emitters 202 may include a processor being configured to implement a visual indication that provides instruction for guiding a user to a vehicle seat. For example, the processor of the light emitters 202 may receive control data that controls one or more of the light emitters 202 and implement the visual indication based on the control data. The control data may include, but is not limited to, data representing a selection of the one or more of the light emitters 202, data representing an activate signal being configured to activate the one or more of the emitters 202, data representing a selected color of the one or more of the light emitters 202, and/or data representing a light pattern of the one or more of the light emitters 202.

As one example, the processor of the light emitters 202 may receive control data including a selection of the light emitters 202A. The light emitters 202A may be configured to emit light based on the data representing an activate signal of light 202A. The light emitters 202A may be further be configured to emit a selected color of light, such as green, based on data representing the selected color of the light emitters 202A. In some examples, each of the light emitters 202A may be individually controlled based on the data representing a light pattern. Therefore, based on the control data, the light emitters 202A located in quadrant Q1 may provide a visual indication that provides instruction for guiding a user to the vehicle seat 240A.

In some examples, the vehicle 200 may further comprise various audio emitters 204 embedded in the vehicle headliner 206. In other examples, the audio emitters 204 may be located at locations of the vehicle headliner 206 other than what is indicated in FIG. 2A. The audio emitters 204 may be configured to output an audio indication that provides instruction for guiding a user to a vehicle seat. For example, the audio emitter 204A may be configured to output an audio indication that provides instruction for guiding a user to the vehicle seat 240A.

Figure 2B:
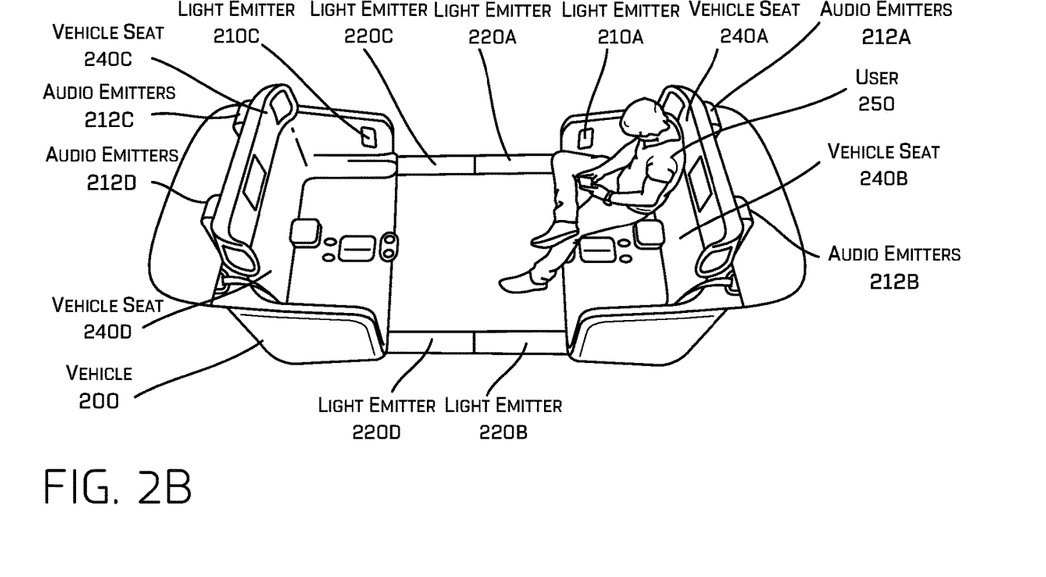
FIG. 2B is a perspective top view of an example vehicle with various light emitters and audio emitters embedded in a vehicle cabin of the vehicle.

FIG. 2B is a perspective top view of a vehicle 200 with various light emitters 210A-210D (light emitters 210B and 210D are not shown in FIG. 2B) embedded in respective sides of a vehicle cabin 230 and various light emitters 220A-210D embedded in a floor of the vehicle cabin 230. In some examples, the light emitters 210 and the light emitters 220 may be similar to or the same as the light emitters 202 discussed above with reference to FIG. 2A. The vehicle 200 further includes various audio emitters 212A-212D embedded in the vehicle cabin 230. In some examples, the audio emitters 212 may be similar to or the same as the audio emitters 204 discussed above with reference to FIG. 2A.

In some examples, the light emitters 210 may include one or more user interface elements configured to output a visual indication that provides instruction for guiding a user 250 to a vehicle seat. For example, a processor of the light emitters 210 may receive configuration data associated with pre-stored or preset output configurations. The configuration data may be used to present for example, via a user interface element (e.g., the light emitter 210A) associated with the vehicle seat 240A, a welcome message to the user 250. The user interface element (e.g., the light emitter 210A) may be used by the user 250 of the vehicle seat 240A to turn off the visual indication. For example, the user 250 may use the user interface element (e.g., the light emitter 210A) to turn off one or more of the light emitters 202A, 210A, and/or 220A.

In some examples, the vehicle 200 may further comprise various audio emitters embedded in the vehicle cabin 230. The audio emitters may be configured to output an audio indication that provides instruction for guiding the user 250 to the vehicle seat 240A.

Figure 3:
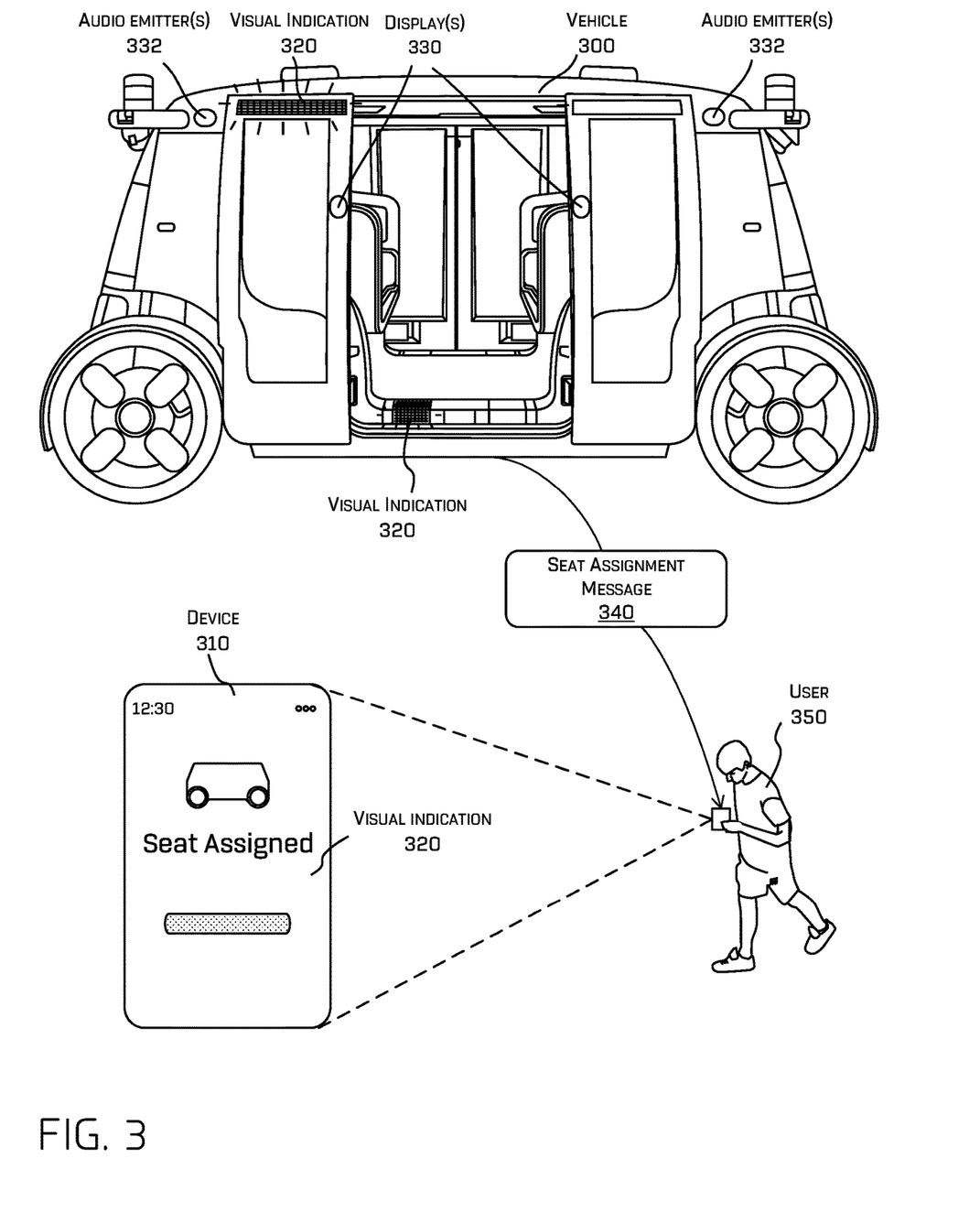
FIG. 3 is an example indication that provides instruction for guiding a user to a vehicle seat.

FIG. 3 is an indication 320 that provides instruction for guiding a user to a vehicle seat.

For example, a vehicle system of a vehicle 300 may assign a vehicle seat based on user data received from a device 310 associated with the user data and configure an HVAC system for the assigned vehicle seat. The vehicle system of the vehicle 300 may further cause one or more light emitters associated with the vehicle seat to output the indication 320 that provides instruction for guiding a user 350 associated with the user data to the vehicle seat.

In some examples, the one or more light emitters associated with the vehicle seat may be embedded within an interior of the vehicle 300, and the indication 320 comprises light emitted via the one or more light emitters. For example, the indication 320 may comprise light emitted via one or more light emitters embedded in a headliner of the vehicle 300 and/or one or more light emitters embedded in a vehicle cabin of the vehicle 300. The one or more light emitters embedded in the vehicle cabin of the vehicle 300 may be embedded in respective sides of the vehicle cabin and/or in a floor of the vehicle cabin.

In some examples, the one or more light emitters associated with the vehicle seat may be embedded within the exterior of the vehicle 300 and the indication 320 comprises light emitted via the one or more light emitters. For example, the indication 320 may comprise light emitted via one or more light emitters embedded in a door of the vehicle 300.

As an example, the indication 320 may comprise turning on one or more light emitters associated with the assigned vehicle seat and turning off one or more light emitters that are not associated with the assigned vehicle seat when the vehicle 300 arrives at a pickup location of the user 350.

In some examples, the indication 320 may comprise a welcome message and/or message indicative of one or more environment settings associated with the vehicle 300, and the indication 320 may be outputted via one or more display(s) 330 located on the exterior of the vehicle 300. As shown in FIG. 3, the one or more display(s) 330 are embedded in a door of the vehicle 300. In other examples, the one or more display(s) 330 may be located at locations of the exterior of the vehicle 300 other than what is indicated in FIG. 3.

In some examples, the indication 320 may comprise an audio message and the indication 320 may be outputted via one or more audio emitter(s) 332 located on the exterior of the vehicle 300. For example, the one or more audio emitter(s) 332 may output an audio message including the name of the user 350 when the vehicle 300 arrives at a pickup location of the user 350. As shown in FIG. 3, the one or more audio emitter(s) 332 are embedded in a headliner of the vehicle 300. In other examples, the one or more audio emitter(s) 332 may be located at locations of the exterior of the vehicle 300 other than what is indicated in FIG. 3.

In some examples, the vehicle system of the vehicle 300 may communicate a seat assignment message 340 to the device 310 and the seat assignment message 340 may be outputted via the device 310. In some examples, the seat assignment message 340 may be communicated from a remote computing device to the device 310. The seat assignment message 340 may include the visual indication 320 indicating the assigned vehicle seat for the user 350. For example, the visual indication 320 may comprise a description of the color of lights emitted via the one or more light emitters associated with the vehicle seat.

In some examples, the vehicle system of the vehicle 300 can receive sensor data from one or more sensors and determine that the user 350 is in the vehicle 300 and not seated on the assigned vehicle seat based on the sensor data. For example, an approximate location of the user 350 can be determined based on GPS data of the device 310. Based on the approximate location of the user 350, the vehicle system of the vehicle 300 can determine whether the user 350 is in the vehicle. The vehicle system of the vehicle 300 can further determine whether the user 350 is seated on the assigned vehicle seat based on sensors associated with the vehicle. For example, the assigned vehicle seat can be coupled with one or more occupancy sensors, and accordingly, the vehicle system can determine that the user 350 is in the vehicle 300 and not seated on the assigned vehicle seat based on the GPS data and the sensor data captured by the one or more occupancy sensors. The vehicle system can further output a second visual indication 320 via one or more light emitters that are associated with the assigned vehicle seat and are embedded within the interior of the vehicle 300. Accordingly, the techniques discussed herein can provide a visual indication that provides instruction for guiding a user to a vehicle seat.

Figure 4:
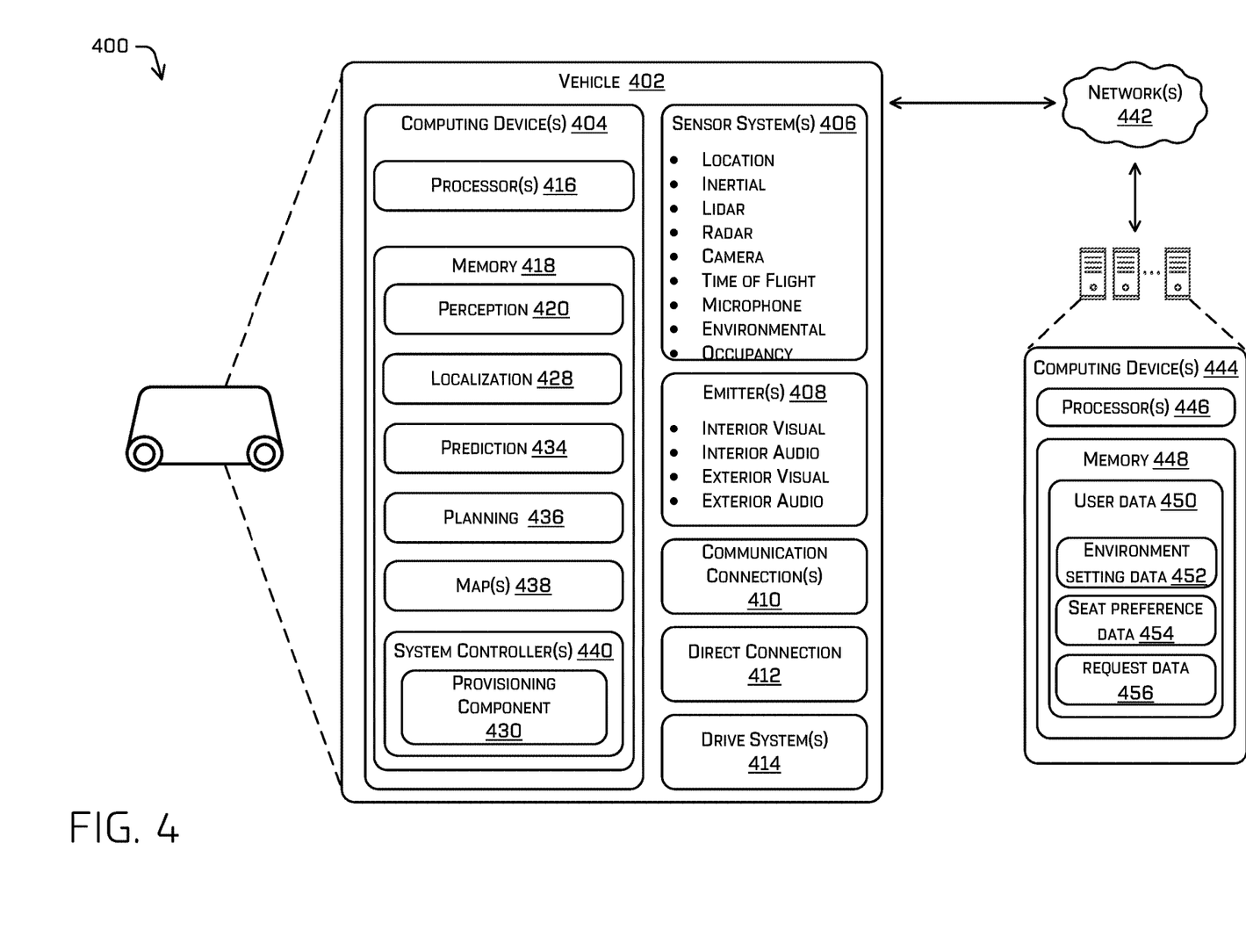
FIG. 4 depicts a block diagram of an example system for implementing the techniques described herein.

FIG. 4 depicts a block diagram of an example system 400 for implementing the techniques described herein. In at least one example, the system 400 can include a vehicle 402. In the illustrated example system 400, the vehicle 402 is an autonomous vehicle; however, the vehicle 402 can be any other type of vehicle.

The vehicle 402 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 402 can be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 402 can include one or more computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 can be configured to capture sensor data associated with an environment.

The one or more sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The one or more sensor system(s) 406 can provide input to the computing device 404.

The vehicle 402 can also include one or more emitter(s) 408 for emitting light and/or sound. The one or more emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also include exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with passengers, pedestrians, or other nearby vehicles, one or more of which may comprise acoustic beam steering technology.

The vehicle 402 can also include one or more communication connection(s) 410 that enables communication between the vehicle 402 and one or more other local or remote computing device(s) (e.g., a remote teleoperation computing device) or remote services. For instance, the one or more communication connection(s) 410 can facilitate communication with other local computing device(s) on the vehicle 402 and/or the one or more drive system(s) 414. Also, the one or more communication connection(s) 410 can allow the vehicle 402 to communicate with other nearby computing device(s) (e.g., other nearby vehicles, traffic signals, etc.).

The one or more communications connection(s) 410 can include physical and/or logical interfaces for connecting the computing device 404 to another computing device or one or more external networks 442 (e.g., the Internet). For example, the one or more communications connection(s) 410 can enable Wi-Fi-based communication such as via frequencies defined by the IEEE 802.11 standards, short-range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 402 can include one or more drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate the loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and control the operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s).

The computing device 404 can include one or more processor(s) 416 and memory 418 communicatively coupled with the one or more processor(s) 416. In the illustrated example, the memory 418 of the computing device 404 stores a perception component 420, a localization component 428, a prediction component 434, a planning component 436, a maps component 438, and one or more system controller(s) 440. Though depicted as residing in the memory 418 for illustrative purposes, it is contemplated that the perception component 420, the localization component 428, the prediction component 434, the planning component 436, the maps component 438, and the one or more system controller(s) 440 can additionally, or alternatively, be accessible to the computing device 404 (e.g., stored in a different component of the vehicle 402) and/or be accessible to the vehicle 402 (e.g., stored remotely).

The perception component 420 can include functionality to perform object detection, segmentation, and/or classification. In some examples, the perception component 420 can provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In additional and/or alternative examples, the perception component 420 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

Further, the perception component 420 can include functionality to store perception data generated by the perception component 420. In some instances, the perception component 420 can determine a track corresponding to an object that has been classified as an object type. For purposes of illustration only, the perception component 420, using sensor system(s) 406 can capture one or more images of an environment. The sensor system(s) 406 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 406, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to the motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The localization component 428 can include functionality to receive data from the sensor system(s) 406 and/or other components to determine a position of the vehicle 402. For example, the localization component 428 can include and/or request/receive a three-dimensional map of an environment and can continuously determine a location of the autonomous vehicle within the map. In some instances, the localization component 428 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 428 can provide data to various components of the vehicle 402 to determine an initial position of an autonomous vehicle for generating a trajectory, as discussed herein.

The prediction component 434 can generate one or more probability maps representing prediction probabilities of possible locations of one or more objects in an environment. For example, the prediction component 434 can generate one or more probability maps for vehicles, pedestrians, animals, and the like within a threshold distance from the vehicle 402. In some instances, the prediction component 434 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 436 can determine a path for the vehicle 402 to follow to traverse through an environment. For example, the planning component 436 can determine various routes and paths and various levels of detail. In some instances, the planning component 436 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 436 can generate an instruction for guiding the autonomous vehicle along at least a portion of the route from the first location to the second location. In at least one example, the planning component 436 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 436 can alternatively, or additionally, use data from the perception component 420 and/or the prediction component 434 to determine a path for the vehicle 402 to follow to traverse through an environment. For example, the planning component 436 can receive data from the perception component 420 and/or the prediction component 434 regarding objects associated with an environment. Using this data, the planning component 436 can determine a route to travel from a first location (e.g., a current location) to a second location (e.g., a target location) to avoid objects in an environment. In at least some examples, such a planning component 436 may determine there is no such collision free path and, in turn, provide a path which brings the vehicle 402 to a safe stop avoiding all collisions and/or otherwise mitigating damage.

The memory 418 can further include one or more map(s) 438 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like): spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more map(s) 438 can include at least one map (e.g., images and/or a mesh). In some examples, the vehicle 402 can be controlled based at least in part on the map(s) 438. That is, the map(s) 438 can be used in connection with the perception component 420 (and sub-components), the localization component 428 (and sub-components), the prediction component 434, and/or the planning component 436 to determine a location of the vehicle 402, identify objects in an environment, generate prediction probabilit(ies) associated with objects and/or the vehicle 402, and/or generate routes and/or trajectories to navigate within an environment.

In at least one example, the computing device 404 can include one or more system controller(s) 440, which can be configured to control steering, propulsion, braking, safety, emitters, communication, and other systems of the vehicle 402. The one or more system controller(s) 440 can further include a provisioning component 430 configured to perform the operations of configuring the vehicle 402. These system controller(s) 440 can communicate with and/or control corresponding systems of the drive system(s) 414 and/or other components of the vehicle 402, which may be configured to operate in accordance with a path provided from the planning component 436.

The vehicle 402 can connect to computing device(s) 444 via network 442 and can include one or more processor(s) 446 and memory 448 communicatively coupled with the one or more processor(s) 446. In at least one instance, the one or more processor(s) 446 can be similar to the processor(s) 416 and the memory 448 can be similar to the memory 418. In the illustrated example, the memory 448 of the computing device(s) 444 stores user data 450.

In some examples, the user data 450 can include environment setting data 452 indicating one or more environment settings associated with the vehicle 402, such as, the temperature, humidity, air flow rate, active safety setting, and/or suspension setting. The environment setting data 452 may be provided by a user associated with the computing device(s) 444 via a user interface of the computing device(s) 444. The provisioning component 430 may receive the environment setting data 452 from the computing device(s) 444 and the system controller(s) 440 may control steering, propulsion, braking, safety, emitters, communication, and other systems of the vehicle 402 based on the received environment setting data 452.

In some examples, the user data 450 can include seat preference data 454. The seat preference data 454 may be provided by a user associated with the computing device(s) 444 via the user interface of the computing device(s) 444. The provisioning component 430 may receive the seat preference data 454 and determine a vehicle seat for a user associated with the computing device(s) 444. For example, the seat preference data 454 may indicate the user prefers a forward-facing seat, and the provisioning component 430 may assign a forward-facing seat to the user.

In some examples, the user data 450 can include request data 456. The provisioning component 430 may receive the request data 456 from the provisioning component 430 and determine one or more environment settings associated with the vehicle 402 based on the request data 456. For example, the request data 456 may include information about previous rides, such as temperatures, humidifies, and air flow rates of the previous rides. provisioning component 430 may determine a preferred temperature, humidity, and air flow rate based on the request data 456. For example, the vehicle system may calculate an average requested temperature, an average requested humidity, and an average requested air flow rate based on the request data 456. The system controller(s) 440 may further control steering, propulsion, braking, safety, emitters, communication, and other systems of the vehicle 402 based on the determined one or more environment settings associated with the vehicle 402.

The processor(s) 416 of the computing device 404 and the processor(s) 446 of the computing device(s) 444 can be any suitable processor capable of executing instructions to process data and perform operations as described herein. By way of example and not limitation, the processor(s) 416 and 456 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 of the computing device 404 and the memory 448 of the computing device(s) 444 are examples of non-transitory computer-readable media. The memory 418 and 448 can store an operating system and one or more software applications, instructions, programs, and/or data to implement the methods described herein and the functions attributed to the various systems. In various implementations, the memory 418 and 448 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 418 and 448 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Accordingly, the techniques discussed herein provide techniques for receiving user data from a device associated with the user data, determining a vehicle seat based on the user data, control a vehicle system based on the user data, and outputting a visual indication that provides instruction for guiding a user to the vehicle seat.

Figure 5:
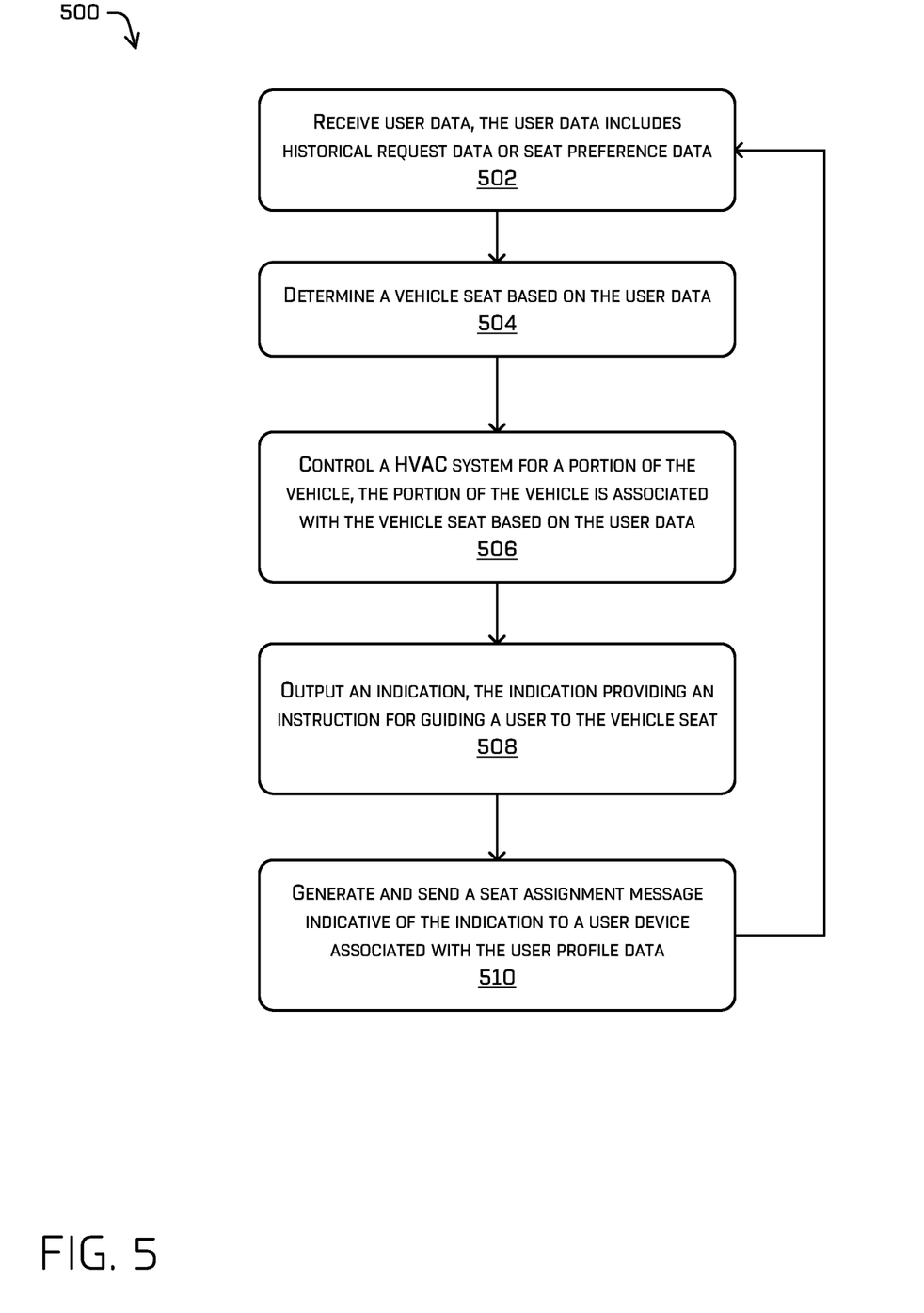
FIG. 5 is a flowchart illustrating an example process for guiding a user to a vehicle seat.
Figure 6:
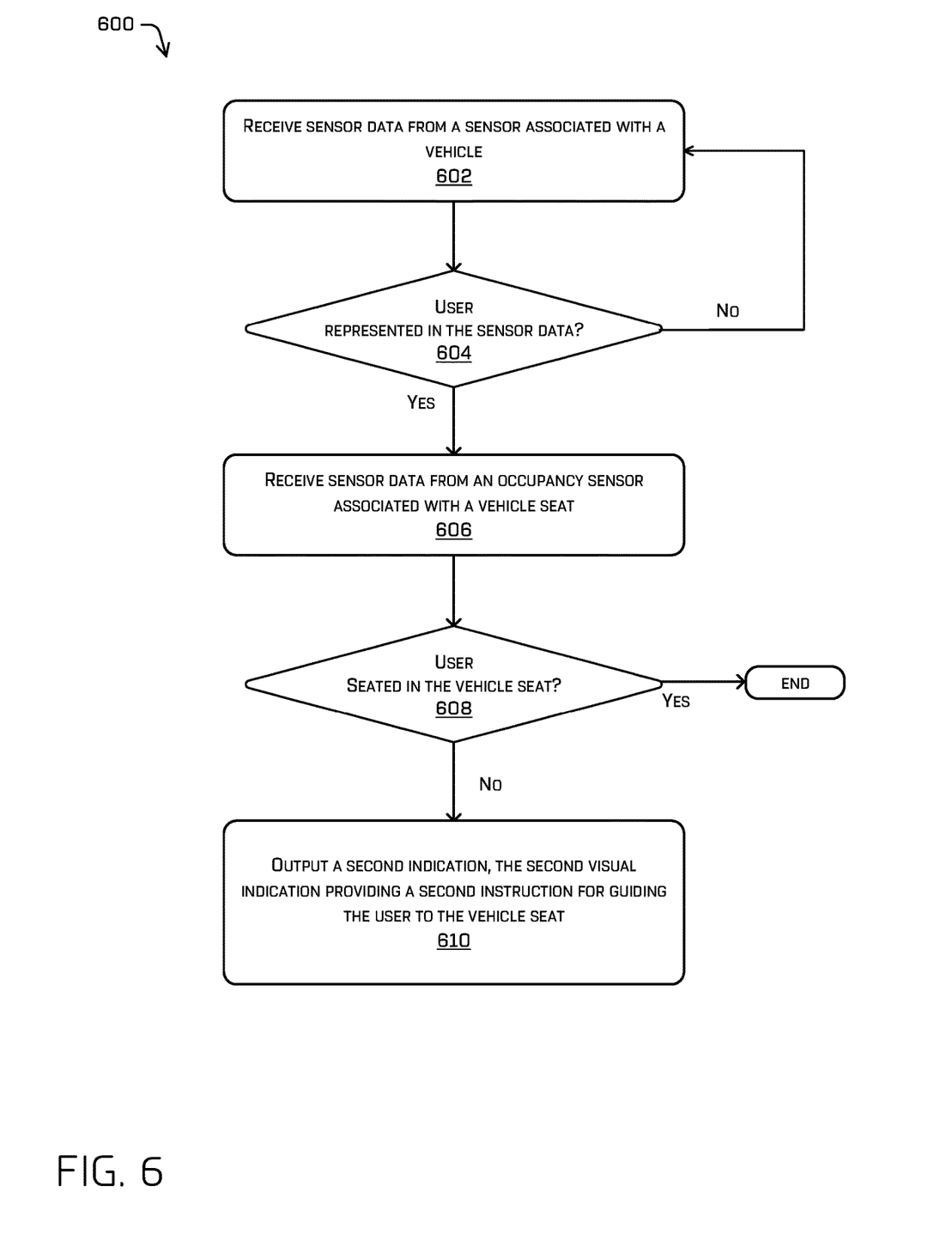
FIG. 6 is a flowchart illustrating an example process for guiding a user between vehicle seats.

FIGS. 1, 5, and 6 illustrate example processes in accordance with examples of the disclosure. These processes are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 5 is an example process for receiving user data from a device associated with the user data, determining a vehicle seat based on the user data, control a vehicle system based on the user data, and outputting a visual indication that provides instruction for guiding a user to the vehicle seat. For example, some or all of the process 500 can be performed by one or more components in FIG. 4, as described herein. For example, some or all of the process 500 can be performed by the provisioning component 430.

At operation 502, the process can include receiving user data from a device associated with the user data. In some examples, the user data may include one or more environment settings associated with a vehicle, such as, for example, the temperature, humidity, air flow rate, active safety setting, and/or suspension setting. In some examples, the user data may include request data indicating information about previous rides, such as temperatures, humidifies, and air flow rates of the previous rides. In some examples, the user data may include seat preference data indicating seat preferences, such as preferred seat direction, preferred seat height, preferred seat angle, preferred seat stiffness, and/or preferred legroom distance.

At operation 504, the process can include determining a vehicle seat based on the user data. In some examples, the operation 504 can include determining the vehicle seat based on seat preference data, such as the preferred seat direction.

At operation 506, the process can include controlling an HVAC system for a portion of the vehicle. In some examples, the portion of the vehicle is associated with the vehicle seat determined based on the user data. In some examples, the operation 506 can include configuring a component (e.g., an HVAC unit) of the HVAC system to provide an ability for the user to adjust the temperature, humidity, and/or air flow rate according to his or her preferences.

At operation 508, the process can include outputting an indication that provides instruction for guiding the user to the vehicle seat. In some examples, the operation 508 can include outputting the indication via one or more light emitters embedded in an interior of the vehicle to guide the user to the vehicle seat. For example, the operation 508 can include outputting the indication via one or more light emitters embedded in a headliner of the vehicle. As another example, the operation 508 can include outputting the indication via one or more light emitters embedded in a floor or respective sides of the vehicle. In some examples, the operation 508 can include outputting the indication via one or more light emitters embedded in the exterior of the vehicle to guide the user to the vehicle seat. In some examples, the operation 508 can include outputting the indication via the device associated with the user data. In some examples, the operation 508 can further include outputting the indication via one or more audio emitters.

At operation 510, the process can include generating and sending a seat assignment message to the device associated with the user data. The seat assignment message indicates the indication and the vehicle seat assigned to the user.

FIG. 6 is an example process for receiving sensor data from one or more sensors associated with a vehicle, determining that a user associated with a user data is in the vehicle and not seated on the vehicle seat for the user associated with the user data based on the sensor data, and outputting a second indication that provide a second instruction for guiding the user to the vehicle seat. For example, some or all of the process 600 can be performed by one or more components in FIG. 4, as described herein. For example, some or all of the process 600 can be performed by the provisioning component 430.

At operation 602, the process can include receiving sensor data form a sensor associated with associated with the vehicle.

At operation 604, the process can include determining whether the user associated with the user data is in the vehicle. In some examples, the operation 604 can include determining whether the user associated with the user data is in the vehicle based on GPS data of a device associated with the user profile data. In some examples, the operation 604 can include determining whether the user associated with the user data is in the vehicle based on camera data captured from one or more cameras in the vehicle. If the user associated with user data is not in the vehicle, operation 602 is executed. If the user associated with user data is in the vehicle, operation 604 is executed.

At operation 606, the process can include receiving sensor data from an occupancy sensor associated with a vehicle seat.

At operation 608, the process can include determining whether the user associated with the user data is seated in the vehicle seat. In some examples, the operation 608 can include determining whether the user associated with the user data is seated in the vehicle seat based on the sensor data from the occupancy sensor associated with the vehicle seat. If the user associated with user data is seated in the vehicle seat, process 600 terminates at operation 608 (e.g., the trip can begin). If the user associated with user data is not seated in the vehicle seat, operation 610 is executed.

At operation 610, the process can include output a second indication that provides a second instruction for guiding the user to the vehicle seat. In some examples, the operations 608 and 610 can repeat for a predetermined number of times until the user may remain in a seat other than the seat indicated for the user, and the vehicle can transfer settings from the intended seat to the actual seat selected by the user to adjust HVAC settings, or other settings of the vehicle.

EXAMPLE CLAUSES

A. A system comprising: one or more processors: and one or more non-transitory computer-readable media storing instructions executable by the one or more processors, wherein the instructions, when executed by the one or more processors, cause the one or more processors to perform operations comprising: receiving, at an autonomous vehicle, data indicative of a request from a user to book the autonomous vehicle: determining, based at least in part on the request from the user, a vehicle seat for the user: accessing user data associated with the user, the user data associated with a temperature setting: controlling, based at least in part on the temperature setting, a heating, ventilation, and air condition (HVAC) system for a portion of the autonomous vehicle, wherein the portion of the autonomous vehicle is includes the vehicle seat; determining that the user is in proximity to the autonomous vehicle: and outputting a visual indication within an interior of the autonomous vehicle, the visual indication providing an instruction for guiding the user to the vehicle seat.

B. The system as paragraph A recites, further comprising one or more light emitters embedded in a headliner of the autonomous vehicle, wherein the visual indication comprises light emitted via the one or more light emitters.

C. The system as paragraph A or B recites, the operations further comprising: generating a seat assignment message indicative of the visual indication and the vehicle seat for the user: and sending the seat assignment message to a user device associated with the user data.

D. The system as any of paragraphs A-C recite, the operations further comprising: receiving sensor data from one or more sensors associated with the autonomous vehicle: determining, based at least in part on the sensor data, that the user associated with the user data is in the autonomous vehicle and not seated on the vehicle seat: and outputting a second visual indication within the interior of the autonomous vehicle, the second visual indication providing a second instruction for guiding the user to the vehicle seat.

E. A method comprising: accessing user data indicative of a setting associated with an autonomous vehicle: determining a vehicle seat for a user associated with the user data: determining a configuration of a vehicle system associated with the vehicle seat based at least in part on the setting: and outputting, via a component of the autonomous vehicle, an indication within an interior of the autonomous vehicle, wherein the indication is associated with providing an instruction for guiding the user to the vehicle seat.

F. The method as paragraph E recites, wherein the indication within the interior of the autonomous vehicle is outputted via at least one of: one or more light emitters embedded in a headliner of the autonomous vehicle: one or more floor lights; one or more directional lights: one or more task lights: one or more displays: or one or more passive seat identifiers.

G. The method as paragraph E or F recites, further comprising: generating a seat assignment message indicative of the indication: and sending the seat assignment message to a user device associated with the user data.

H. The method as any of paragraphs E-G recite, wherein the setting associated with the autonomous vehicle comprises at least one of: an environment setting, an active safety setting, a suspension setting, a seat setting, or an entertainment setting.

I. The method as any of paragraphs E-H recite, further comprising: receiving sensor data from one or more sensors associated with the autonomous vehicle; determining, based at least in part on the sensor data, that the user associated with the user data is in the autonomous vehicle and not seated on the vehicle seat for the user associated with the user data: and at least one of: outputting a second indication within the interior of the autonomous vehicle, the second indication providing a second instruction for guiding the user to the vehicle seat: or sending a seat assignment message indicative of the indication to a user device associated with the user data.

J. The method as paragraph I recites, wherein the one or more sensors comprises an occupancy sensor associated with the vehicle seat.

K. The method as any of paragraphs E-J recite, wherein the indication is outputted via one or more light emitters embedded in a headliner of the autonomous vehicle, wherein outputting the indication comprises: turning on one or more light emitters associated with the vehicle seat for the user associated with the user data: and turning off one or more light emitters that are not associated with the vehicle seat for the user associated with the user data.

L. The method as any of paragraphs E-K recite, the method further comprising: sending data associated with the setting associated with the autonomous vehicle to a user device associated with the user data.

M. The method as any of paragraphs E-L recite, wherein the user data further comprises seat preference data indicating a preferred seat direction, the method further comprising: determining, based on the seat preference data, the vehicle seat.

N. The method as paragraph M recites, further comprising: determining, based at least in part on a current condition of a second seat or a previous condition of the vehicle seat, the vehicle seat.

O. The method as any of paragraphs E-N recite, wherein the indication is outputted via one or more audio emitters associated with the autonomous vehicle.

P. One or more non-transitory computer-readable media storing instructions that, when executed by one or more processors, cause the one or more processors to perform operations comprising: accessing user data indicative of a setting associated with an autonomous vehicle: determining a vehicle seat for a user associated with the user data: determining a configuration of a vehicle system associated with the seat based at least in part on the setting: and outputting, via a component of the autonomous vehicle, an indication within an interior of the autonomous vehicle, wherein the indication is associated with providing an instruction for guiding the user to the vehicle seat.

Q. The one or more non-transitory computer-readable media as paragraph P recites, wherein the indication within the interior of the autonomous vehicle is outputted via at least one of: one or more light emitters embedded in a headliner of the autonomous vehicle: one or more floor lights: one or more directional lights: one or more task lights: one or more displays: or one or more passive seat identifiers.

R. The one or more non-transitory computer-readable media as paragraph P or Q recites, wherein the operations further comprise: generating a seat assignment message indicative of the indication for the user; and sending the seat assignment message to a user device associated with the user data.

S. The one or more non-transitory computer-readable media as any of paragraphs P-R recite, wherein the operations further comprise: receiving sensor data from one or more sensors associated with the autonomous vehicle: determining, based at least in part on the sensor data, that the user associated with the user data is in the autonomous vehicle and not seated on the vehicle seat for the user associated with the user data; and at least one of: outputting a second indication within the interior of the autonomous vehicle, the second indication providing a second instruction for guiding the user to the vehicle seat: or sending a seat assignment message indicative of the indication to a user device associated with the user data.

T. The one or more non-transitory computer-readable media as any of paragraphs P-R recite, wherein the operations further comprise: sending data associated with the setting associated with the autonomous vehicle to a user device associated with the user data.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed by the one or more processors, cause the one or more processors to perform operations comprising:
receiving, at an autonomous vehicle, data indicative of a request from a user to book the autonomous vehicle;
accessing user data associated with the user, wherein the user data comprises at least a seat preference data indicating a preferred seat direction, comprising a front-facing direction or a back-facing direction, relative to a direction of travel of the autonomous vehicle and a temperature setting;
determining, as an assigned vehicle seat and based at least in part on the request from the user, the assigned vehicle seat of a plurality of vehicle seats for the user, wherein the assigned vehicle seat is determined based at least in part on the preferred seat direction;
controlling, based at least in part on the temperature setting, a heating, ventilation, and air condition (HVAC) system for a portion of the autonomous vehicle, wherein the portion of the autonomous vehicle includes the assigned vehicle seat;
determining that the user is in proximity to the autonomous vehicle; and
outputting a first visual indication within an interior of the autonomous vehicle, the first visual indication providing an instruction for guiding the user to the assigned vehicle seat.

2. The system of claim 1, further comprising one or more light emitters embedded in a headliner of the autonomous vehicle, wherein the first visual indication or a second visual indication comprises light emitted via the one or more light emitters.

3. The system of claim 1, the operations further comprising:
generating a seat assignment message indicative of the first visual indication or a second visual indication and the assigned vehicle seat for the user; and
sending the seat assignment message to a user device associated with the user data.

4. A method comprising:
accessing user data indicative of a setting associated with an autonomous vehicle, wherein the user data further comprises seat preference data indicating a preferred seat direction comprising a front-facing direction or a back-facing direction relative to a direction of travel of the autonomous vehicle;
determining, as an assigned vehicle seat, the assigned vehicle seat of a plurality of vehicle seats for a user associated with the user data, wherein the assigned vehicle seat is determined based at least in part on the preferred seat direction;
determining a configuration of a vehicle system associated with the assigned vehicle seat based at least in part on the setting; and
outputting, via a component of the autonomous vehicle, a first indication within an interior of the autonomous vehicle, wherein the first indication is associated with providing an instruction for guiding the user to the assigned vehicle seat.

5. The method of claim 4, wherein the first indication or a second indication within the interior of the autonomous vehicle is outputted via at least one of:
one or more light emitters embedded in a headliner of the autonomous vehicle;
one or more floor lights;
one or more directional lights;
one or more task lights;
one or more displays; or
one or more passive seat identifiers.

6. The method of claim 4, further comprising:
generating a first seat assignment message indicative of the first indication; and
sending the first seat assignment message to a user device associated with the user data.

7. The method of claim 4, wherein the setting associated with the autonomous vehicle comprises at least one of: an environment setting, an active safety setting, a suspension setting, a seat setting, or an entertainment setting.

8. The method of claim 4, further comprising:
receiving sensor data from one or more sensors associated with the autonomous vehicle; and
determining, based at least in part on the sensor data, that the user associated with the user data is in the autonomous vehicle and not seated on the assigned vehicle seat for the user associated with the user data,
wherein the one or more sensors comprises an occupancy sensor associated with the assigned vehicle seat.

9. The method of claim 4, wherein the first indication or a second indication is outputted via one or more light emitters embedded in a headliner of the autonomous vehicle, wherein outputting the first indication or the second indication comprises:

turning on one or more light emitters associated with the assigned vehicle seat for the user associated with the user data; and     turning off one or more light emitters that are not associated with the assigned vehicle seat for the user associated with the user data.

10. The method of claim 4, the method further comprising:

sending data associated with the setting associated with the autonomous vehicle to a user device associated with the user data.

11. The method of claim 4, further comprising:

determining, based at least in part on a current condition of a second seat or a previous condition of the assigned vehicle seat, the assigned vehicle seat.

12. The method of claim 4, wherein the first indication or a second indication is outputted via one or more audio emitters associated with the autonomous vehicle.

13. One or more non-transitory computer-readable media storing instructions that, when executed by one or more processors, cause the one or more processors to perform operations comprising:

Accessing user data indicative of a setting associated with an autonomous vehicle, wherein the user data further comprises seat preference data indicating a preferred seat direction comprising a front-facing direction or a back-facing direction relative to a direction of travel of the autonomous vehicle;

determining, as an assigned vehicle seat, the assigned vehicle seat of a plurality of vehicle seats for a user associated with the user data, wherein the assigned vehicle seat is determined based at least in part on the preferred seat direction;

determining a configuration of a vehicle system associated with the assigned vehicle seat based at least in part on the setting; and     outputting, via a component of the autonomous vehicle, a first indication within an interior of the autonomous vehicle, wherein the first indication is associated with providing an instruction for guiding the user to the assigned vehicle seat.

14. The one or more non-transitory computer-readable media as claim 13 recites, wherein the first indication or a second indication within the interior of the autonomous vehicle is outputted via at least one of:

one or more light emitters embedded in a headliner of the autonomous vehicle;

one or more floor lights;

one or more directional lights;

one or more task lights;

one or more displays; or one or more passive seat identifiers.

15. The one or more non-transitory computer-readable media as claim 13 recites, wherein the operations further comprise:

generating a first seat assignment message indicative of the first indication for the user; and     sending the first seat assignment message to a user device associated with the user data.

16. The system of claim 1, wherein the operations further comprise:

determining, based at least in part on a first ambient temperature of a second seat or a second ambient temperature of the assigned vehicle seat, the assigned vehicle seat.

17. The system of claim 1, wherein second indication within the interior of the autonomous vehicle is outputted via one or more light emitters embedded in a headliner or a floor of the autonomous vehicle.

18. The system of claim 1, the operations further comprise:

receiving sensor data from one or more sensors associated with the autonomous vehicle;

determining, based at least in part on the sensor data, that the user associated with the user data is in the autonomous vehicle and not seated on the assigned vehicle seat; and     outputting a second visual indication within the interior of the autonomous vehicle, the second visual indication providing a second instruction for guiding the user to the assigned vehicle seat.

19. The method of claim 4, further comprises:

receiving sensor data from one or more sensors associated with the autonomous vehicle;

determining, based at least in part on the sensor data, that the user associated with the user data is in the autonomous vehicle and not seated on the assigned vehicle seat for the user associated with the user data; and     at least one of:

outputting a second indication within the interior of the autonomous vehicle, the second indication providing a second instruction for guiding the user to the assigned vehicle seat; or     sending a seat assignment message indicative of the second indication to a user device associated with the user data.

20. The one or more non-transitory computer-readable media as claim 13 recites, wherein the operations further comprise:

receiving sensor data from one or more sensors associated with the autonomous vehicle;

determining, based at least in part on the sensor data, that the user associated with the user data is in the autonomous vehicle and not seated on the assigned vehicle seat for the user associated with the user data; and     at least one of:

outputting a second indication within the interior of the autonomous vehicle, the second indication providing a second instruction for guiding the user to the assigned vehicle seat; or     sending a seat assignment message indicative of the second indication to a user device associated with the user data.

21. The system of claim 1, wherein the autonomous vehicle is a bidirectional vehicle, and wherein the direction of travel is based on one of two bidirectional modes of operation of the bidirectional vehicle.

\* \* \* \* \*